Sept. 22, 1953     D. W. WASSHEM     2,652,734
GRIPPING DEVICE
Filed Feb. 25, 1952
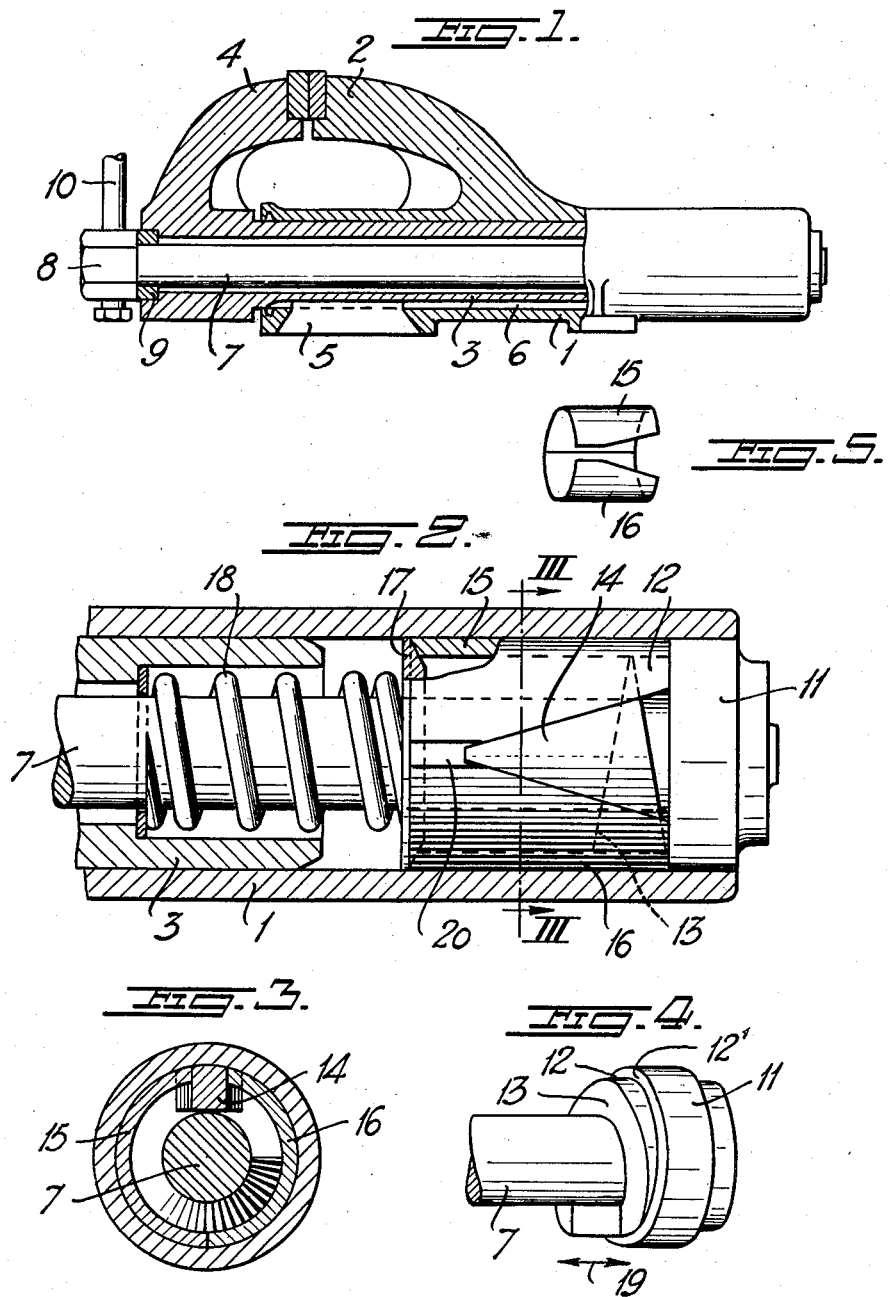

Patented Sept. 22, 1953

2,652,734

UNITED STATES PATENT OFFICE 2,652,734

GRIPPING DEVICE

Dore Waldemar Wasshem, Norrkoping, Sweden

Application February 25, 1952, Serial No. 273,164
In Sweden February 13, 1952

5 Claims. (Cl. 81—17)

1

The present invention relates to gripping devices, such as vises or chucks, the jaws of which are supported by tubes in telescopic engagement with each other and in which means are provided for interlocking said tubes and tightening them with relation to each other. More particularly, the invention relates to gripping devices of said type in which the locking and tightening means comprise a sleeve having a wedge-shaped slit and a wedge member in engagement with said slit, the locking and tightening operation being effected by a relative axial displacement of said elements with relation to each other.

An object of the invention is to provide a gripping device of this type which allows a rapid operation in gripping and releasing work piece.

A feature of the invention resides in the provision on the inner one of two telescopic tubes or on a member connected thereto of a helical surface for effecting said axial displacement by a rotary movement of a control element. To this end, said helical surface is engaged by the bottom end of the wedge member, so that a rotation of the element carrying the helical surface will effect or allow an axial displacement of the wedge member.

According to another feature of the invention the sleeve is shaped as a straight cylinder and bears at that end which merges with the wider portion of the wedge-shaped slit, against an axially stationary shoulder, and is engaged at its opposite end by an axially resilient support.

A still further feature involves a sleeve comprising two semicylinders, or more than two members, separated by longitudinal slits and curved in conformity with the cylindrical inner surface of the outer tube.

The invention is illustrated in the accompanying drawing, in which:

Fig. 1 is a part sectional side elevation of a vise embodying the invention;

Fig. 2 is an axial section on a larger scale of the right hand portion of Fig. 1 shown in side elevation therein;

Fig. 3 is a cross section on the line III—III of Fig. 2;

Fig. 4 is a perspective view of part of the control element, and

Fig. 5 is a perspective view of the sleeve members.

The vise illustrated in the drawing comprises as main elements an outer tubular member 1 adapted to be attached to a table (not shown) and provided with a jaw 2, preferably formed integrally therewith, and an inner tubular member 3 slidable axially in the member 1 and pro-

2 vided with a preferably integral jaw 4 for cooperation with the jaw 2. The jaw 2 represents the stationary jaw, and the jaw 4 represents the movable jaw of the vise. In order to prevent the tubular members 1 and 3 from rotation with relation to each other the outer tubular member 1 has attached thereto a cross head key 5 slidably engaging a groove 6 formed in the inner tubular member 3. Extending centrally through the inner tubular member 3 is a locking and tightening rod 7 projecting at one end beyond the end of the tubular member 3 supporting the jaw 4 and carrying by its projecting end a nut 8 bearing against a ring 9 fitted in an enlargement of the bore of the inner tubular member 3. The nut 8 as well as the end of the rod carrying same are formed with a transverse bore for receiving a control lever 10 for rotating the rod 7.

The opposite end of the rod 7 extends beyond the adjacent end of tube 3 and is connected to a piston-like head 11 inside the outer tube 1. Said member 11 is of a diameter approximately equal to the inner diameter of the outer tube so that it can be rotated therein. On its side facing the rod 7 the head 11 is formed with a cylindrical projection 12 of a smaller diameter so that a shoulder $12^1$ is formed on the head 11 around the projection 12. The end surface of the projection 12 is helically cut, as shown at 13, to serve as a guide surface for a wedge 14 having a correspondingly helically cut base surface for cooperation with the helical surface 13, as shown in Fig. 2.

Surrounding the cylindrical surface of the projection 12 are two semicylindrical sleeve portions 15 and 16 which form together a sleeve having a wedge-shaped slit for receiving the wedge 14. At 20, Fig. 2, is shown a longitudinal extension of said slit, said extension being of uniform width along its entire length. The semicylindrical sleeve portions 15, 16 engage by their peripheral surfaces the inner cylindrical surface of the outer tube 1. The end surfaces of the sleeve members 15, 16 facing the head 11 is situated in a plane at right angles to the axial direction of the sleeve members and bear against the shoulder of head 11. The end surfaces of the sleeve members 15, 16 remote from the head 11 is conically countersunk to receive the correspondingly conical end of a washer 17 the conicity being such that the members 15 and 16 may be forced outwardly against the inner wall of tube 1 when the washer 17 is forced axially thereagainst. The washer 17 is under the action of a helical spring 18 inserted between the washer and a shoulder formed in the inner tube 4.

The operation is as follows:

In the released, or normal, state of the locking and tightening device, the jaw 4 may be easily moved axially by operating the lever 10 so as to allow the insertion of a work piece between the jaws and then pushing the jaw 4 by hand until it holds the work piece with a moderate pressure against the stationary jaw 2. This means saving of time, as compared with the operation of usual vises in which the movable jaw is moved by a screwing operation. The work piece having thus been initially gripped by the jaws, the rod 7 is rotated by means of the lever 10 in such a direction as to cause the helical surface 13 to displace the wedge member 14 in the direction away from the head 11. This may be done because of the fact that the sleeve members 15, 16 are held in frictional engagement with the inner surface of tube 1 under the action of spring 18 via washer 17, so that the members 15, 16 and thus also the wedge 14 are prevented from rotating with the head 11. By said longitudinal movement of the wedge 14 (to the left in Fig. 2) the sleeve members 15, 16 are tightened against the said inner cylindrical surface of tube 1 and locked thereto. Since the tube 1 is stationary, the sleeve members 15, 16 and the wedge 14 are also held stationary. It is thus obvious that in the continued rotation of the rod 7 the obliquely cut base surface of the wedge 14 will act as a stationary guideway for the helical surface 13 causing the head 11 with rod 7 and inner tube 3 with jaw 4 to move to the right in Fig. 2, that is to say, the jaw 4 is drawn nearer to the stationary jaw 2. This means a tightening of the jaws upon the work piece.

In the example shown, the tightening effect may, as a maximum, correspond to a rotation of the rod through a complete revolution, and the maximum tightening displacement may be equal to the distance between the inlet and outlet ends of the helical surface 13 during one revolution, that is to say, equal to the distance 19 in Fig. 4, which is quite sufficient in practice. As regards the material commonly used in work pieces only a fraction of a revolution is required.

To release the work piece the lever 10 is rotated in the opposite direction, thereby removing the pressure of the surface 13 on the wedge. The pressure of the wedge on the sleeve members 15, 16 likewise ceases, thereby unlocking them from the tube 1. The movable jaw 4 is now free for quick sliding adjustment.

The vise described has the advantage of allowing oiling of the locking and tightening device, thereby reducing the wear and allowing the movable elements to move noiselessly and easily. In spite of this oiling and the fact that the locking action depends on frictional engagement, a reliable locking effect may nevertheless be obtained. This is due to the division of the expanding sleeve into two separate parts as well as to the conical shape of the coengaging surfaces of the washer 17 and the sleeve members. Said sleeve members are always maintained in engagement with the inner surface of the tube 1 and the use of separate sleeve members brings the advantage with it that the sleeve members may readily stick to the inner surface of the tube upon a rotation of the rod 7.

I claim:

1. A gripping mechanism comprising a pair of jaws, an inner and an outer tube in telescopic engagement with each other for supporting said jaws, a locking and tightening device being provided between said tubes and comprising a sleeve expansible into contact with said outer tube and having a wedge-shaped slit and a wedge in engagement with said slit, said sleeve and said wedge being relatively movable longitudinally of the outer tube, said inner tube having a rotatable control device comprising a central rod rotatably mounted in the inner tube, a piston-like head on said rod mounted in the outer tube, a helical surface being provided on one side of a portion of said head for engaging said wedge so as to effect an axial displacement thereof upon rotation of said control device, said head portion having a smaller diameter than the head proper to provide an annular shoulder at the base of said portion.

2. A gripping mechanism comprising a pair of jaws, an inner and an outer tube in telescopic engagement with each other for supporting said jaws, a locking and tightening device being provided between said tubes and comprising a sleeve expansible into contact with said outer tube and having a wedge-shaped slit and a wedge in engagement with said slit, said sleeve and said wedge being relatively movable longitudinally of the outer tube, said inner tube having a rotatable control device comprising a central rod rotatably mounted in the inner tube, a piston-like head on said rod mounted in the outer tube, a helical surface being provided on one side of a portion of said head for engaging said wedge so as to effect an axial displacement thereof upon rotation of said control device, said head portion having a smaller diameter than the head proper to provide an annular shoulder at the base of said portion for engagement with one end of the expansible sleeve, the other end of said sleeve being under the action of a spring load tending to maintain said engagement.

3. A gripping device as claimed in claim 2, in which the expansible sleeve comprises at least two longitudinally extending members, capable of separately engaging the inner cylindrical surface of the outer tube by their entire outer surface.

4. A gripping device as claimed in claim 2, in which the spring load comprises a helical spring and a washer acted on by said spring for transmitting the spring action to the end of the expansible sleeve remote from the annular shoulder of the control device.

5. A gripping device as claimed in claim 2, in which the spring load comprises a helical spring and a washer acted on by said spring for transmitting the spring action to the end of the expansible sleeve remote from the annular shoulder of the control device, the end of the sleeve engaged by the washer being conically countersunk and the surface of the washer in engagement therewith being correspondingly conical.

DORE WALDEMAR WASSHEM.

References Cited in the file of this patent

UNITED STATES PATENTS

| Number | Name | Date |
| --- | --- | --- |
| 621,294 | Culver | Mar. 14, 1899 |
| 631,991 | James et al. | Aug. 29, 1899 |
| 1,155,027 | Wright | Sept. 28, 1915 |
| 2,599,222 | Bergqvist | June 3, 1952 |

FOREIGN PATENTS

| Number | Country | Date |
| --- | --- | --- |
| 119,666 | Sweden | Sept. 2, 1947 |